United States Patent Office.

WILLIAM M. KIMBER, OF SACRAMENTO CITY, CALIFORNIA.

Letters Patent No. 96,012, dated October 19, 1869.

IMPROVED VARNISH FOR PLASTERED WALLS AND FOR COATING OTHER SURFACES.

The Schedule referred to in these Letters Patent and making part of the same.

*To all whom it may concern:*

Be it known that I, WILLIAM M. KIMBER, of the city and county of Sacramento, State of California, have invented or discovered an Improved Varnish or Porcelain-Finish; and I do hereby declare that the following is a full explanation of my invention or discovery, enumerating the names of the ingredients necessary, and the proportions of each to be used to produce or make my said porcelain-finish or varnish, with directions for using the same.

My invention relates to an improved varnish, or what I call a porcelain-finish, for producing a smooth and brilliant finish upon walls, both plastered and painted.

The wall, after being treated with one coat of my varnish or finish, can be cleaned with water and soap, if necessary, without in the least injuring the plaster. It is also an excellent varnish for preventing damp in walls, and when common paint is covered with a single coat, it is absolutely prevented from cracking or checking when it is exposed to the air, as is the case when the paint is used alone.

In order to make my varnish or mixture for producing a finish, I take of gum-camphor, two (2) pounds, and dissolve it in one (1) gallon of alcohol. I then take one (1) pound sulphate of magnesia, and triturate it in a mortar, with water, until about sixty (60) per cent. of the magnesia is dissolved. The water of solution thus obtained is then mixed with one-half ($\frac{1}{2}$) gallon of spirits of turpentine, after which I add the camphor-solution. This mixture is then incorporated with five gallons of any of the light varnishes, when it is ready for use.

The varnish can be applied in the ordinary manner, with a brush. I prefer a broad kalsomine or whitewash-brush, as the work can be done much more quickly than by the use of the ordinary paint-brush.

One covering or coat of this varnish will be sufficient to give any wall a firm and smooth glazed surface, and, when mixed with dammar varnish, one which will be impervious to water.

When applied to green wood in which there remains a quantity of sap, the wood will be prevented from cracking or checking during the process of drying.

For carriages and cars, or other vehicles which are constantly exposed to the weather, my varnish will be of the greatest advantage, as the paint will not lose its lustre or finish, even after long exposure.

When applied to walls, the varnish will, after becoming thoroughly dry, be perfectly white, even more so than the plaster-of-Paris finish which is commonly used, and over which it is placed, and no amount of exposure will cause it to become yellow or discolored.

Leather, and fabrics of all kinds when treated with a coat of this varnish, will be rendered water-proof, and will not become cracked from frequent handling.

Having thus described my invention,

What I claim, and desire to secure by Letters Patent, is—

A finish or varnish for covering and protecting walls and painted surfaces, composed of the ingredients herein enumerated, mixed and compounded in about the proportions and in the manner specified, substantially as and for the purpose above set forth.

In witness whereof, I have hereunto set my hand and seal.

WILLIAM M. KIMBER. [L. S.]

Witnesses:
WM. GERLACH,
J. L. BOONE.